(12) United States Patent
Kagarlitsky et al.

(10) Patent No.: US 11,893,688 B2
(45) Date of Patent: Feb. 6, 2024

(54) METHOD OF FUSING MESH SEQUENCES WITHIN VOLUMETRIC VIDEO

(71) Applicant: TETAVI LTD., Ramat Gan (IL)

(72) Inventors: Sefy Kagarlitsky, Ramat Gan (IL); Shirley Keinan, Tel Aviv (IL); Amir Green, Mitzpe Netofa (IL); Yair Baruch, Tel Aviv (IL); Roi Lev, Brooklyn, NY (US); Michael Birnboim, Holon (IL); Miky Tamir, Tel Aviv (IL)

(73) Assignee: TETAVI LTD., Ramat Gan (IL)

( * ) Notice: Subject to any disclaimer, the term of this patent is extended or adjusted under 35 U.S.C. 154(b) by 105 days.

(21) Appl. No.: 17/551,606

(22) Filed: Dec. 15, 2021

(65) Prior Publication Data

US 2022/0189115 A1 Jun. 16, 2022

Related U.S. Application Data

(60) Provisional application No. 63/125,416, filed on Dec. 15, 2020.

(51) Int. Cl.
*G06T 17/20* (2006.01)
*G06T 5/50* (2006.01)
*G06T 5/00* (2006.01)

(52) U.S. Cl.
CPC .............. *G06T 17/20* (2013.01); *G06T 5/002* (2013.01); *G06T 5/50* (2013.01); *G06T 2207/20221* (2013.01)

(58) Field of Classification Search
None
See application file for complete search history.

(56) References Cited

U.S. PATENT DOCUMENTS

| 8,384,714 | B2 | 2/2013 | De Aguiar et al. |
| 2012/0027259 | A1 | 2/2012 | Bruijns et al. |
| 2018/0012407 | A1* | 1/2018 | Chuang ................... G06T 13/40 |

FOREIGN PATENT DOCUMENTS

| EP | 2411964 A1 | 2/2012 |
| EP | 3520387 A1 | 8/2019 |

(Continued)

OTHER PUBLICATIONS

PCT International Search Report for International Application No. PCT/IL2021/051486, dated Mar. 7, 2022, 4pp.

(Continued)

*Primary Examiner* — Yingchun He
(74) *Attorney, Agent, or Firm* — The Roy Gross Law Firm, LLC; Roy Gross (57) ABSTRACT

A computer-implemented method of smoothing a transition between two mesh sequences to be rendered successively comprises steps of: (a) providing first and second mesh sequences {1} and {2} formed mesh frames, respectively, to be fused into a fused sequence; (b) selecting mesh frames $g_n$ and $g_m$ being candidates for fusing therebetween; calculating geometric rigid and/or non-rigid transformations of candidate frames $g_n$ and $g_m$ belonging to said first and second mesh sequences {1} and {2}; applying calculated geometric rigid and/or non-rigid transformations to candidate frames $g_n$ and $g_m$ belonging to said first and second mesh sequences {1} and {2}; calculating textural transformations of said candidate frames $g_n$ and $g_m$ belonging to said first and second mesh sequences {1} and {2}; and applying calculated textural transformation to said candidate frames $g_n$ and $g_m$ belonging to said first and second mesh sequences {1} and {2}.

20 Claims, 4 Drawing Sheets

(56) References Cited

FOREIGN PATENT DOCUMENTS

EP        3660781 A1    6/2020
WO    2019047984 A1    3/2019

OTHER PUBLICATIONS

PCT Written Opinion for International Application No. PCT/IL2021/051486, dated Mar. 7, 2022, 4pp.

* cited by examiner

METHOD OF FUSING MESH SEQUENCES WITHIN VOLUMETRIC VIDEO

CROSS REFERENCE

This application claims the benefit of priority of U.S. Provisional Patent Application No. 63/125,416, filed Dec. 15, 2020, the contents of which are all incorporated herein by reference in their entirety.

FIELD OF THE INVENTION

The present invention relates to the processing volumetric video, and, more specifically, to fusing volumetric clips.

BACKGROUND OF THE INVENTION

Space-time shape reconstruction of a deforming object from scanned point clouds has been an intensely studied problem in computer graphics and geometry processing recently. An essential and particularly challenging sub-problem is that of space-time registration of the captured shapes across all time frames.

U.S. Pat. No. 8,384,714 discloses a volumetric representation of a figure correlated with an image of the figure. Reference points are found that are common to each of two temporally distinct images of the figure, the reference points representing movement of the figure between the two images. A volumetric deformation is applied to the digital representation of the figure as a function of the reference points and the correlation of the volumetric representation of the figure. A fine deformation is applied as a function of the coarse/volumetric deformation. Responsive to the applied deformations, an updated digital representation of the figure is generated.

When two mesh sequences are fused, the mesh frame belonging to the end video frame of the previous mesh frame sequence should be transformed into the mesh frame belonging to the start mesh frame of the successive mesh frame sequence. Thus, there is a long-felt and unmet need for providing a method of fusing mesh sequences directed to softening the transition between the mesh frame sequences to be fused.

SUMMARY OF THE INVENTION

It is hence one object of the invention to disclose a computer-implemented method of smoothing a transition between two mesh sequences to be rendered successively. The aforesaid method comprising steps of: (a) providing first and second mesh sequences $\{1\}$ and $\{2\}$ formed mesh frames, respectively, to be fused into a fused sequence; said first mesh sequence positioned before said second mesh sequence within said fused sequence; (b) selecting mesh frames $g_n$ and $g_m$ being candidates for fusing therebetween; said candidates $g_n$ selected within a first mesh frame group $\{G_1\}$ positioned in an end portion of said first mesh sequence $\{1\}$ and candidates $g_m$ selected within a second mesh group $\{G_2\}$ positioned a start portion of said second mesh sequence; (c) calculating geometric rigid and/or non-rigid transformations of candidate frames $g_n$ and $g_m$ belonging to said first and second mesh sequences $\{1\}$ and $\{2\}$; (d) applying calculated geometric rigid and/or non-rigid transformations to candidate frames $g_n$ and $g_m$ belonging to said first and second mesh sequences $\{1\}$ and $\{2\}$; (e) calculating textural transformations of said candidate frames $g_n$ and $g_m$ belonging to said first and second mesh sequences $\{1\}$ and $\{2\}$; and (f) applying calculated textural transformation to said candidate frames $g_n$ and $g_m$ belonging to said first and second mesh sequences $\{1\}$ and $\{2\}$.

A further object of the present invention is to provide the step of selecting candidate mesh frames $g_n$ and $g_m$ comprising a sub-step of selecting groups $\{Ng_n\}$ and $\{Ng_m\}$ formed by mesh frames $g_{n\pm i}$ or $g_{m\pm j}$ surrounding said mesh frames $g_n$ and $g_m$, respectively, where m and n are numbers of image frame, i and j are nonzero integers.

A further object of the present invention is to provide the step of calculating geometric rigid and/or non-rigid transformations of candidate frames $g_n$ and $g_m$ comprising a sub-step of calculating rigid transformation $rt(g_{nm}, g_{mm})$ providing a minimal distance between said groups $\{Ng_n\}$ or $\{Ng_m\}$.

A further object of the present invention is to provide the step of calculating geometric rigid and/or non-rigid transformations of candidate frames $g_n$ and $g_m$ further comprising calculating non-rigid transformation $nrt(g_{nm}, g_{mm})$.

A further object of the present invention is to provide the step of calculating geometric rigid and/or non-rigid transformations of candidate frames $g_n$ and $g_m$ comprising a sub-step of dividing calculated said rigid transformation $rt(g_{nm}, g_{mm})$ and said non-rigid transformation $nrt(g_{nm}, g_{mm})$ between a set of continuous frames belonging to said first and/or second mesh sequences $\{1\}$ and $\{2\}$.

A further object of the present invention is to provide the step of applying geometric rigid and/or non-rigid transformations to candidate frames $g_n$ and $g_m$ comprising applying divided $rt(g_{nm}, g_{mm})$ and $nrt(g_{nm}, g_{mm})$ to corresponding frames.

A further object of the present invention is to provide the applying textural transformations of said candidate frames $g_n$ and $g_m$ belonging to said first and second mesh sequences $\{1\}$ and $\{2\}$ comprising a step of alpha blending texture of frames $g_n$ to $g_{n+k}$ and/or $g_m$ to $g_{m+k}$ with texture transformed by non-rigid transformation $nrt(g_{nm}, g_{mm})$ with weight depending of parameter p being in range [0, k].

A further object of the present invention is to provide at least one of said first and second mesh sequences obtained by a step of rigging a captured video.

A further object of the present invention is to provide the step of calculating the non-rigid transformation based on rigged mesh frame sequences of the captured video.

A further object of the present invention is to provide the step of calculating said non-rigid transformation further comprises calculating an initial guess based on rigged mesh frame sequences of said captured video and calculating a final non-rigid transformation based on said initial guess.

A further object of the present invention is to provide the first and second mesh frame sequences taken from different times in a clip entirely belonging to one take.

A further object of the present invention is to provide the first and second mesh frame sequences which are identical. An end portion of said second mesh frame sequence is fused with a start portion of said first mesh frame sequence such that said first and second mesh frame sequence are looped to each other.

A further object of the present invention is to provide the first and second mesh frame sequences belonging to different takes.

A further object of the present invention is to provide a computer-implemented system for smoothing a transition between two mesh sequences to be rendered successively. The aforesaid computer-implemented system comprises: (a) a processor; (b) a memory storing instructions which, when executed by said processor, direct said processor to performing steps of: (i) providing first and second mesh sequences {1} and {2} formed mesh frames, respectively, to be fused into a fused sequence; said first mesh sequence positioned before said second mesh sequence within said fused sequence; (ii) selecting mesh frames $g_n$ and $g_m$ being candidates for fusing therebetween; said candidates $g_n$ selected within a first mesh frame group $\{G_1\}$ positioned in an end portion of said first mesh sequence {1} and candidates $g_m$ selected within a second mesh group $\{G_2\}$ positioned a start portion of said second mesh sequence; (iii) calculating geometric rigid and/or non-rigid transformations of candidate frames $g_n$ and $g_m$ belonging to said first and second mesh sequences {1} and {2}; (iv) applying calculated geometric rigid and/or non-rigid transformations to candidate frames $g_n$ and $g_m$ belonging to said first and second mesh sequences {1} and {2}; (v) calculating textural transformations of said candidate frames $g_n$ and $g_m$ belonging to said first and second mesh sequences {1} and {2}; and (vi) applying calculated textural transformations to of said candidate frames $g_n$ and $g_m$ belonging to said first and second mesh sequences {1} and {2}.

A further object of the present invention is to provide a non-transitory computer readable medium comprising instructions to a processor for performing a method of smoothing a transition between two mesh sequences to be rendered successively; said instructions comprise steps of: (a) providing first and second mesh sequences {1} and {2} formed mesh frames, respectively, to be fused into a fused sequence; said first mesh sequence positioned before said second mesh sequence within said fused sequence; (b) selecting mesh frames $g_n$ and $g_m$ being candidates for fusing therebetween; said candidates $g_n$ selected within a first mesh frame group $\{G_1\}$ positioned in an end portion of said first mesh sequence {1} and candidates $g_m$ selected within a second mesh group $\{G_2\}$ positioned a start portion of said second mesh sequence; (c) calculating geometric rigid and/or non-rigid transformations of candidate frames $g_n$ and $g_m$ belonging to said first and second mesh sequences {1} and {2}; (d) applying geometric rigid and/or non-rigid transformations to candidate frames $g_n$ and $g_m$ belonging to said first and second mesh sequences {1} and {2}; (e) calculating textural transformations of said candidate frames $g_n$ and $g_m$ belonging to said first and second mesh sequences {1} and {2}; and (f) applying textural transformations to of said candidate frames $g_n$ and $g_m$ belonging to said first and second mesh sequences {1} and {2}.

A further object of the present invention is to provide a computer-implemented method of smoothing transition between cut mesh frame sequences to be rendered continuously; said method comprising steps of: (a) providing a mesh sequence to be looped; (b) selecting mesh frames $g_n$ and $g_m$ being candidates for fusing therebetween; said candidates $g_n$ selected within a first mesh frame group $\{G_1\}$ positioned in an end portion of said mesh sequence and candidates $g_m$ selected within a second mesh group $\{G_2\}$ positioned a start portion of said mesh sequence; (c) calculating geometric rigid and/or non-rigid transformations of candidate frames $g_n$ and $g_m$ belonging to said first and second mesh sequences {1} and {2}; (d) applying geometric rigid and/or non-rigid transformations to candidate frames $g_n$ and $g_m$ belonging to said first and second mesh sequences {1} and {2}; (e) calculating textural transformations of said candidate frames $g_n$ and $g_m$ belonging to said first and second mesh sequences {1} and {2}; and (f) applying textural transformations to of said candidate frames $g_n$ and $g_m$ belonging to said first and second mesh sequences {1} and {2}.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a computer-implemented method of fusing mesh sequences, a computer-implemented system for implementing the aforesaid method and a non-transitory computer readable medium comprising instructions to a processor for performing the aforesaid method.

The purpose of the present invention is to provide a method of fusing two mesh frame sequences of looping one mesh frame sequence so that continuity of character movements is kept.

The term "frame" hereinafter refers to individual picture on a strip of film.

The term "scene" hereinafter refers to a dramatic action consisting of one or more shots and taking place in more or less continuous time and space.

The term "sequence" hereinafter refers to a dramatic unit including shots or scenes linked together by a common idea or image. The sequence can span different times or location as long as its dramatic elements and structure are unified.

The term "take" hereinafter refers to one of the many recordings of a given shot. Most of the time, each shot in a film is photographed over and over again. The best version (or take) of each shot is chosen for the final film.

Mesh sequences can be obtained by the ways such as capturing volumetric video, rigging captured character movements and moving a rigged mesh according to a user's commands (for example, in computer games).

The exemplary technical problem to be solved by the present invention is in keeping continuousness of movements of a character in a video volumetrically captured by at least two cameras. A computer game character obtained from a volumetric capture sequence can be fused with a game play controlled by the user. Looping a mesh sequence (i.e creating an endless walking person) is also in the scope of the present invention. The result to be achieved implies smoothy transition such that a viewer (user) does not notice the transition moment at all. This is achieved by finding two geometrically similar start and end frames and fusing them together in geometry and texture.

Filming technology in some cases does not allow capturing a film episode continuously in all its entirety. Filming continuousness can be broken by changing cameras, scene locations as the play progresses. Therefore, the clips (mesh frame sequences) captured by different cameras at different locations are fused into a continuously renderable mesh frame sequence. In post-production, these sequences are merged together to make a whole scene.

In volumetric video (as in theatre), changing the camera location is not possible since the viewer decides on the point of view so to merge different takes to a full sequence the fusing technique is needed.

Cuts between mesh frame sequences is more complicated than cuts between 2d videos because transitions of changing camera locations are not possible.

In some cases, a continuous action to be filmed (such as running) is very technically difficult to be filmed in a volumetric capturing studio (due to the limited capture area). The continuously renderable mesh frame sequence can be obtained by creating infinite loops of running people. Two identical mesh frame sequences captured in the volumetric studio are fused to each other.

A mesh frame sequence when rigged can be moved in predetermined degrees of freedom defined by virtual joints.

In some embodiments, the rigging degrees of freedom are implemented by the non-rigid transformation, if we want to fuse a sequence of a rigged running person with a volumetric jumping person. We can move the running person legs in the last frames to match the jumping person frames in the first frames.

In other embodiment, the skeleton movement is just part of the non-rigid transformation. Movement of the clothing details on the character can have more degrees of freedom in addition to the skeleton movements.

Figure 1:
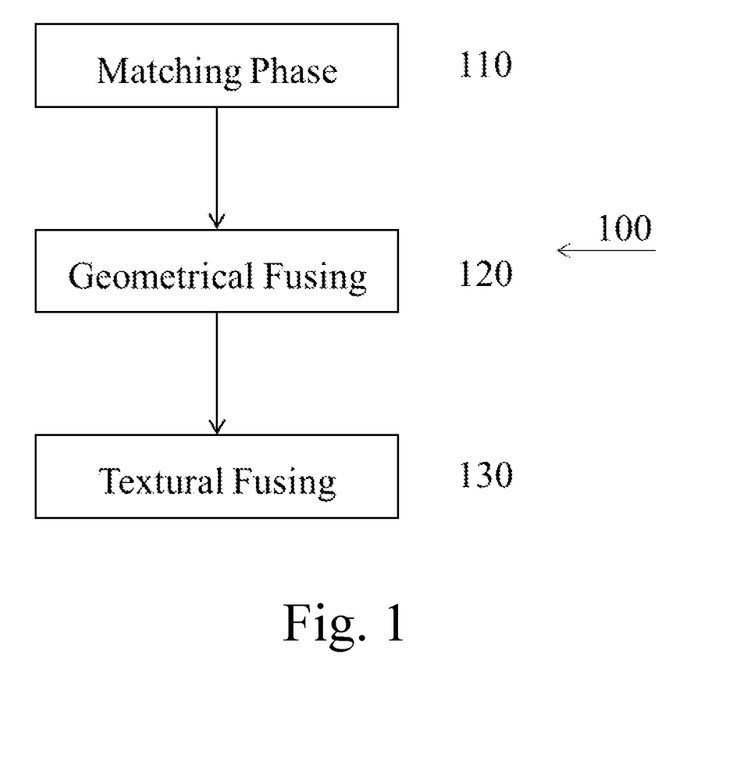
FIG. 1 is a flowchart of a method of fusing mesh sequences within a volumetric video.

Reference is now made to FIG. 1 presenting a flowchart of method 100 of fusing mesh sequences. At step 110 which is matching phase, the best rigid transformation for each candidate to be start and end frames is found such that meshes belonging to the start, end and adjacent frames are spaced apart from each other by a minimal distance. According to one unlimiting embodiment, 5 frames are used for evaluating the relevance of the aforesaid candidates.

Geometrical fusing (step 120) comprises a non-rigid transformation calculated and used to perfectly match the best candidate selected at step 110. Texture fusing (step 130) includes non-rigid transformation of the mesh frame (start frame) belonging to the first sequence to fit the four frames (last frame) belonging to the second sequence and transforming the start frame texture to each of the last frames by means of gradual alpha blending such that smooth change in the color tone is achieved.

Figure 2A:
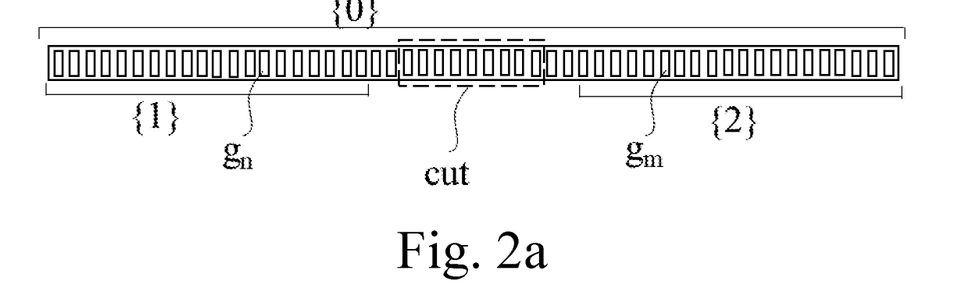
FIGS. 2a and 2b are schematic diagrams illustrating cutting a portion of a mesh frame sequence and fusing two mesh frame sequences.
Figure 2B:
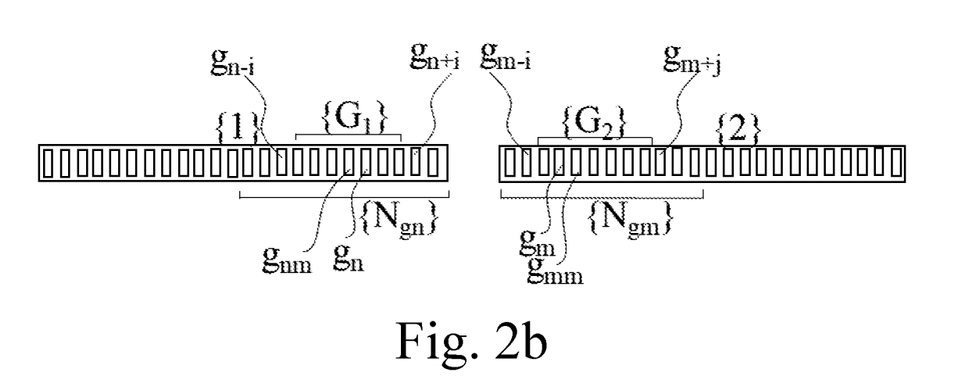

Reference is now made to FIGS. 2a and 2b illustrating the present invention. FIG. 2a depicts cutting mesh frame sequence {0}. Specifically, the middle portion of mesh frame sequence {0} is cut. Remaining mesh frames $g_n$ and $g_m$ form mesh frame sequences {1} and {2}.

Reference is now made to FIG. 2b illustrating the procedure of fusing mesh frame sequences {1} and {2}. It should be emphasized that the procedure shown in FIG. 2b is applicable to any pair of mesh frame sequences and is not limited by the presented embodiment. {$G_1$} is a first mesh frame group positioned in the end portion of said first mesh frame sequence {1}. {$G_2$} is a second mesh frame group positioned in a start portion of said second mesh frame sequence {2}. $g_n$ and $g_m$ refer the mesh frames being candidate to be fused. {$Ng_n$} is a subgroup formed by frames $g_{n\pm i}$ surrounding frame $g_n$. {$Ng_m$} is a subgroup formed by frames $g_{m\pm j}$ surrounding frame $g_m$, where i and j are non-zero integers. $g_{nm}$ belonging to {$Ng_n$} and $g_{mm}$ belonging to {$Ng_m$} are defined as having a minimal distance therebetween when transformed by a rigid transformation.

Figure 3:
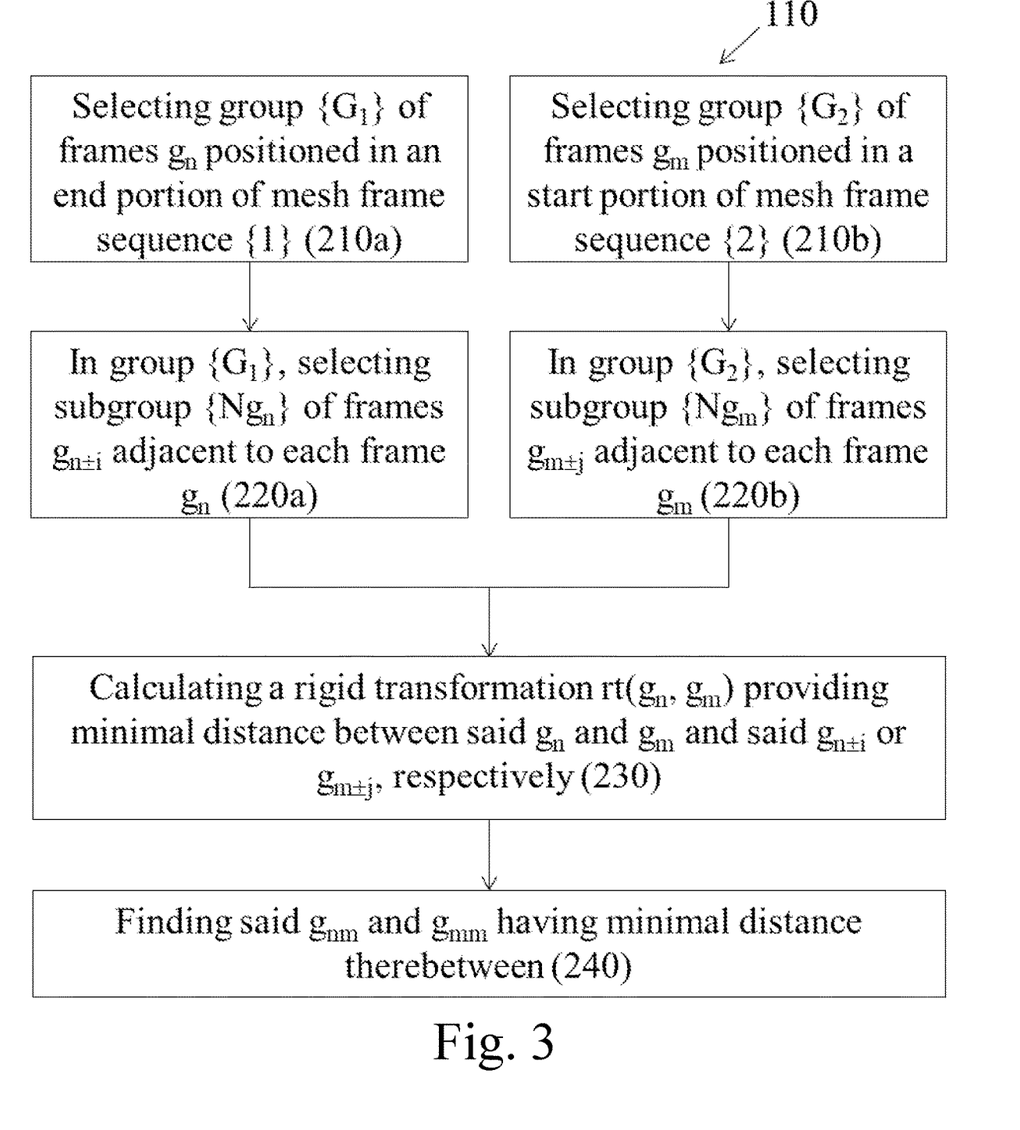
FIG. 3 is a flowchart of a matching phase of the method of fusing mesh sequences.

Reference is now made to FIG. 3 presenting a flowchart of matching phase 110 of the method of fusing mesh sequences within an volumetric video. Steps 210a and 210b are directed to selecting group {$G_1$} of frames $g_n$ positioned in an end portion of mesh frame sequence {1} and group {$G_2$} of frames $g_m$ positioned in a start portion of mesh frame sequence {2}, respectively. Then, at steps 220a and 220b in groups {$G_1$} and {$G_2$} subgroups {$Ng_n$} of frames $g_{ni}$ and {$Ng_m$} of frames $g_{mj}$ are selected. Frames $g_{ni}$ and $g_{mj}$ surround frames $g_n$ and $g_m$, respectively. Matching phase 110 further includes step 230 of calculating a rigid transformation $rt(g_n, g_m)$ such that a minimal distance between said $g_n$ and $g_m$ and said $g_{ni}$ or $g_{mj}$, respectively is provided. After applying the obtained rigid transformation $rt(g_n, g_m)$ to the abovementioned frames, frames $g_{nm}$ and $g_{mm}$ having minimal distance therebetween are determined.

Figure 4:
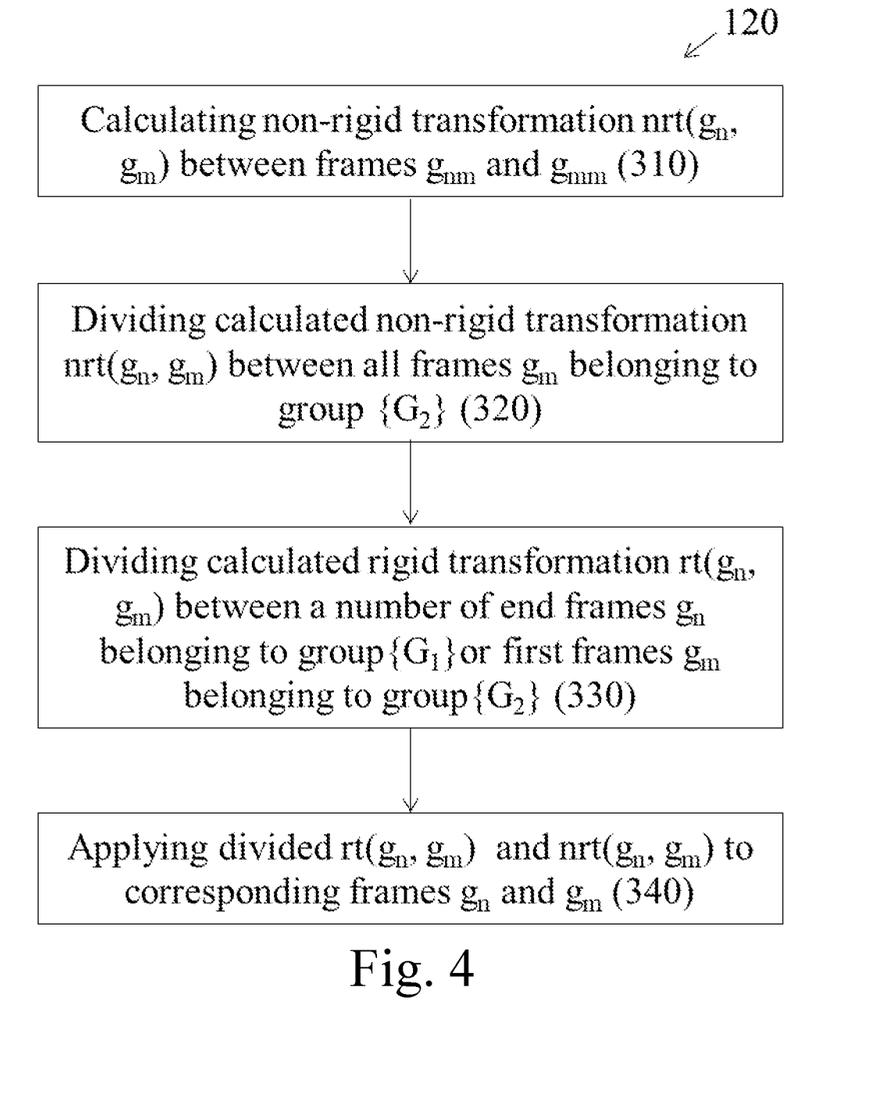
FIG. 4 is a flowchart of a geometric fusing phase of the method of fusing mesh sequences within a volumetric video.

Reference is now made to FIG. 4 presenting a flowchart of geometrical fusing phase 120 includes calculation of non-rigid transformation $nrt(g_n, g_m)$ between frames $g_{nm}$ and $g_{mm}$ at step 310. Then, the calculated non-rigid transformation $nrt(g_n, g_m)$ is divided between all frames $g_m$ belonging to group {$G_2$} at step 320. In addition, calculated rigid transformation $rt(g_n, g_m)$ is divided between a number of end frames $g_n$ belonging to group {$G_1$} or first frames $g_m$ belonging to group {$G_2$} at step 330. The divided $rt(g_n, g_m)$ and $nrt(g_n, g_m)$ are applied to corresponding frames $g_n$ and $g_m$ at step 340.

Textural fusing phase 130 includes stepwise alpha blending texture of frames $g_m$ to $g_{m+k}$ with texture transformed by non-rigid transformation $nrt(g_n, g_m)$ from frames $g_n$ with weight depending of parameter p being in range [0, k].

In cases of mesh sequences equipped with a rigging, the non-rigid transformation can be done by changing the motion parameters that control the rig.

The present invention is applicable to cutting (editing) mesh frame sequences, using rigging for the non-rigid transformation, using rigging as an initial guess for other methods of non-rigid transformation and fusing volumetric video to rigged sequence.

The invention claimed is:

1. A computer-implemented method of smoothing a transition between two mesh sequences to be rendered successively; said method comprising steps of:
   a. providing first and second mesh sequences formed mesh frames, respectively, to be fused into a fused sequence; said first mesh sequence positioned before said second mesh sequence within said fused sequence;
   b. selecting mesh frames $g_n$ and $g_m$ being candidates for fusing therebetween; said candidates $g_n$ selected within a first mesh frame group positioned in an end portion of said first mesh sequence and candidates $g_m$ selected within a second mesh group positioned at a start portion of said second mesh sequence;
   c. calculating geometric rigid and/or non-rigid transformations of candidate frames $g_n$ and $g_m$ belonging to said first and second mesh sequences;
   d. applying calculated geometric rigid and/or non-rigid transformations to candidate frames $g_n$ and $g_m$ belonging to said first and second mesh sequences;
   e. calculating textural transformations of said candidate frames $g_n$ and $g_m$ belonging to said first and second mesh sequences; and
   f. applying calculated textural transformations to said candidate frames $g_n$ and $g_m$ belonging to said first and second mesh sequences.

2. The method according to claim 1, wherein said step of selecting candidate mesh frames $g_n$ and $g_m$ comprises a sub-step of selecting groups $\{Ng_n\}$ and $\{Ng_m\}$ formed by mesh frames $g_{n\,i}$ or $g_{m\,j}$ surrounding said mesh frames $g_n$ and $g_m$, respectively, where m and n are numbers of image frame, i and j are nonzero integers.

3. The method according to claim 2, wherein said step of calculating geometric rigid and/or non-rigid transformations of candidate frames $g_n$ and $g_m$ comprises a sub-step of calculating rigid transformations $rt(g_{nm}, g_{mm})$ providing a minimal distance between said groups $\{Ng_n\}$ or $\{Ng_m\}$.

4. The method according to claim 3, wherein said step of calculating geometric rigid and/or non-rigid transformations of candidate frames $g_n$ and $g_m$ further comprises calculating non-rigid transformations $nrt(g_{nm}, g_{mm})$ and said step of calculating geometric rigid and/or non-rigid transformations of candidate frames $g_n$ and $g_m$ comprises a sub-step of dividing calculated said rigid transformations $rt(g_{nm}, g_{mm})$ and said non-rigid transformations $nrt(g_{nm}, g_{mm})$ between a set of continuous frames- belonging to said first and/or second mesh sequences.

5. The method according to claim 4, wherein said step of applying geometric rigid and/or non-rigid transformations to candidate frames $g_n$ and $g_m$ comprises applying divided $rt(g_{nm}, g_{mm})$- and $nrt(g_{nm}, g_{mm})$ to corresponding frames.

6. The method according to claim 5, wherein said applying textural transformations of said candidate frames $g_n$ and $g_m$ belonging to said first and second mesh sequences comprises a step of alpha blending texture of frames $g_n$ to $g_{n+k}$ and/or $g_m$ to $g_{m+k}$ with texture transformed by non-rigid transformations $nrt(g_{nm}, g_{mm})$ with weight depending of parameter p being in range [0, k].

7. The method according to claim 1, wherein at least one of said first and second mesh sequences is obtained by a step of rigging a captured video and said step of calculating said non-rigid transformations is based on rigged mesh frame sequences of said captured video.

8. The method according to claim 7, wherein said step of calculating said non-rigid transformations further comprises calculating an initial guess based on rigged mesh frame sequences of said captured video and calculating a final non-rigid transformation based on said initial guess.

9. The method according to claim 1, wherein at least one of the following holds true: said first and second mesh sequences are taken from different times in a clip entirely belonging to one take, said first and second mesh sequences being identical; or an end portion of said second mesh sequence is fused with a start portion of said first mesh sequence such that said first and second mesh sequences are looped to each other, said first and second mesh sequences belonging to different takes.

10. A computer-implemented system for smoothing a transition between two mesh sequences to be rendered successively; said computer-implemented system comprising:
  a. a processor;
  b. a memory storing instructions which, when executed by said processor, direct said processor to performing steps of:
    i. providing first and second mesh sequences formed mesh frames, respectively, to be fused into a fused sequence; said first mesh sequence positioned before said second mesh sequence within said fused sequence;
    ii. selecting mesh frames $g_n$ and $g_m$ being candidates for fusing therebetween; said candidates $g_n$ selected within a first mesh frame group positioned in an end portion of said first mesh sequence and candidates $g_m$ selected within a second mesh group positioned at a start portion of said second mesh sequence;
    iii. calculating geometric rigid and/or non-rigid transformations of candidate frames $g_n$ and $g_m$ belonging to said first and second mesh sequences;
    iv. applying calculated geometric rigid and/or non-rigid transformations to candidate frames $g_n$ and $g_m$ belonging to said first and second mesh sequences;
    v. calculating textural transformations of said candidate frames $g_n$ and $g_m$ belonging to said first and second mesh sequences; and
    vi. applying calculated textural transformations to said candidate frames $g_n$ and $g_m$ belonging to said first and second mesh sequences.

11. The system according to claim 10, wherein said step of selecting candidate mesh frames $g_n$ and $g_m$ comprises a sub-step of selecting groups $\{Ng_n\}$ and $\{Ng_m\}$ -formed by mesh frames- $g_{n\,i}$ or $g_{m\,j}$ surrounding said mesh frames $g_n$ and $g_m$, respectively, where m and n are numbers of image frame, i and j are nonzero integers.

12. The system according to claim 11, wherein said step of calculating geometric rigid and/or non-rigid transformations of candidate frames $g_n$ and $g_m$ comprises a sub-step of calculating rigid transformations $rt(g_{nm}, g_{mm})$ providing a minimal distance between said groups $\{Ng_n\}$ or $\{Ng_m\}$.

13. The system according to claim 12, wherein said step of calculating geometric rigid and/or non-rigid transformations of candidate frames $g_n$ and $g_m$ further comprises calculating non-rigid transformations $nrt(g_{nm}, g_{mm})$.

14. The system according to claim 13, wherein said step of calculating geometric rigid and/or non-rigid transformations of candidate frames $g_n$ and $g_m$ comprises a sub-step of dividing calculated said rigid transformations $rt(g_{nm}, g_{mm})$ and said non-rigid transformations $nrt(g_{nm}, g_{mm})$ between a set of continuous frames- belonging to said first and/or second mesh sequences and said step of applying geometric rigid and/or non-rigid transformations to candidate frames $g_n$ and $g_m$ comprises applying divided $rt(g_{nm}, g_{mm})$ -and $nrt(g_{nm}, g_{mm})$ to corresponding frames.

15. The system according to claim 12, wherein said applying textural transformations of said candidate frames $g_n$ and $g_m$ belonging to said first and second mesh sequences comprises a step of alpha blending texture of frames $g_n$ to $g_{n+k}$ and/or $g_m$ to $g_{m+k}$ with texture transformed by said non-rigid transformations $nrt(g_{nm}, g_{mm})$ with weight depending of parameter p being in range [0, k] and at least one of said first and second mesh sequences is obtained by a step of rigging a captured video.

16. The system according to claim 15, wherein said step of calculating said non-rigid transformations is based on rigged mesh frame sequences of said captured video; said step of calculating said non-rigid transformations further comprises calculating an initial guess based on rigged mesh frame sequences of said captured video and calculating a final non-rigid transformation based on said initial guess; and said first and second mesh frame sequences are taken from different times in a clip entirely belonging to one take.

17. The system according to claim 10 wherein at least one of the following holds true: said first and second mesh sequences are taken from different times in a clip entirely belonging to one take, said first and second mesh sequences being identical; or an end portion of said second mesh sequence is fused with a start portion of said first mesh sequence such that said first and second mesh sequences are looped to each other, said first and second mesh sequences belonging to different takes.

18. The system according to claim 10, wherein said first and second mesh sequences are identical; an end portion of said second mesh sequence is fused with a start portion of said first mesh sequence such that said first and second mesh sequences are looped to each other and said first and second mesh sequences belong to different takes.

19. A non-transitory computer readable medium comprising instructions to a processor for performing a method of smoothing a transition between two mesh sequences to be rendered successively; said instructions comprise steps of:

provide first and second mesh sequences formed mesh frames, respectively, to be fused into a fused sequence; said first mesh sequence positioned before said second mesh sequence within said fused sequence;

selecting mesh frames $g_n$ and $g_m$ being candidates for fusing therebetween; said candidates $g_n$ selected within a first mesh frame group positioned in an end portion of said first mesh sequence and candidates $g_m$ selected within a second mesh group positioned at a start portion of said second mesh sequence;

calculating geometric rigid and/or non-rigid transformations of candidate frames $g_n$ and $g_m$ belonging to said first and second mesh sequences;

applying geometric rigid and/or non-rigid transformations to candidate frames $g_n$ and $g_m$ belonging to said first and second mesh sequences;

calculating textural transformations of said candidate frames $g_n$ and $g_m$ belonging to said first and second mesh sequences; and applying textural transformations to said candidate frames $g_n$ and $g_m$ belonging to said first and second mesh sequences.

20. The non-transitory computer readable medium, of claim 19 wherein at least one of the following holds true: said first and second mesh sequences are taken from different times in a clip entirely belonging to one take, said first and second mesh sequences are identical; an end portion of said second mesh sequence is fused with a start portion of said first mesh sequence such that said first and second mesh sequences are looped to each other, said first and second mesh sequences belong to different takes.

* * * * *